(12) United States Patent
Shioda et al.

(10) Patent No.: US 6,697,717 B2
(45) Date of Patent: Feb. 24, 2004

(54) HYBRID CAR

(75) Inventors: Takehiko Shioda, Saitama (JP); Yukitaka Saito, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/254,873

(22) Filed: Sep. 26, 2002

(65) Prior Publication Data

US 2003/0078707 A1 Apr. 24, 2003

(30) Foreign Application Priority Data

Sep. 28, 2001 (JP) .................................... P2001-299694

(51) Int. Cl.⁷ .............................................. G01L 21/00

(52) U.S. Cl. ...................... 701/22; 701/201; 180/65.2; 180/65.4

(58) Field of Search .................... 701/22, 202, 201, 701/208, 209, 213, 55, 56, 204; 180/65.2, 65.4, 65.8, 65.3, 65.1, 68.5; 340/995; 318/587, 139, 568.1; 320/15, 13, 48

(56) References Cited

U.S. PATENT DOCUMENTS

| | | | | |
|---|---|---|---|---|
| 5,539,399 A | * | 7/1996 | Takahira et al. | 340/995 |
| 5,664,635 A | * | 9/1997 | Koga et al. | 180/65.3 |
| 5,778,326 A | * | 7/1998 | Moroto et al. | 701/22 |
| 5,815,824 A | | 9/1998 | Saga et al. | 701/22 |
| 5,892,346 A | * | 4/1999 | Moroto et al. | 318/587 |
| 6,370,451 B2 | * | 4/2002 | Lutz | 701/22 |
| 2002/0188387 A1 | * | 12/2002 | Woestman et al. | 701/22 |

* cited by examiner

Primary Examiner—Thomas G. Black
Assistant Examiner—Tuan C To
(74) Attorney, Agent, or Firm—Sughrue Mion, PLLC

(57) ABSTRACT

A navigation system of a hybrid car retrieves a route to detect whether any restricted area forbidden for automobiles that emit exhaust gases is on the route or not. Before the hybrid car arrives at the restricted area, an electric motor is driven by a gasoline engine portion to charge a battery portion. After the hybrid car arrives at the restricted area, only the electric motor is operated by electric power of the battery portion so that the hybrid car can pass through the restricted area. As a result, the hybrid car can arrive at a destination by the shortest distance without bypassing the restricted area, and the environment of the restricted area can be protected because the gasoline engine portion is not operated in the restricted area.

7 Claims, 10 Drawing Sheets

HYBRID CAR

CROSS REFERENCE OF RELATED APPLICATION

This application is based on and claims priority under 35 U.S.C. §119 with respect to Japanese Patent Application No. 2001-299694 filed on Sep. 28, 2001, the entire content of which is incorporated herein by reference.

BACKGROUND OF THE INVENTION

1. Field of the Invention

The present invention relates to a hybrid car using both an electric motor driven by electric power stored in a battery and an internal combustion engine driven by combustion energy of internally burned fuel as sources for driving travel wheels.

2. Description of the Related Art

There can be used a hybrid car which is improved in fuel economy by about twice and in reduction of carbon dioxide emission by about a half compared with an ordinary automobile and in which emissions of nitrogen oxide, carbon hydride, etc. can be reduced to be not larger than a quarter of the regulated value of Exhaust Emission Standard for 2000.

This hybrid car uses both an electric motor driven by electric power stored in a battery and an internal combustion engine driven by combustion energy of internally burned fuel as sources for driving travel wheels. The electric motor and the internal combustion engine are operated in accordance with the travel state or the like so that the characteristics of the electric motor and the internal combustion engine can be used effectively. Thus, reduction both in fuel consumption and in exhaust emission is achieved.

On the other hand, provision of restricted areas in urban regions, semi-national parks, etc. for environmental protection is under consideration so that riding in automobiles such as gasoline-powered automobiles that emit exhaust gases when travel is completely restricted in the restricted area. Only automobiles such as electric automobiles that do not emit exhaust gases are permitted to pass through such restricted areas.

When a restricted area forbidden for automobiles that emit exhaust gases is between a current position of the hybrid car and a destination, the hybrid car needs to bypass the restricted area because the hybrid car more or less emits exhaust gases when traveling. Hence, there is a problem that the hybrid car takes a long time to arrive at the destination.

It may be conceived now that only the electric motor is driven to make the hybrid car pass through the restricted area so that exhaust gases are not emitted from the hybrid car. Electric energy stored in the battery of the hybrid car, however, always varies. Hence, electric energy sufficient to make the hybrid car pass through the restricted area is not always stored in the battery. Hence, there is a problem that the hybrid car may be unable to pass through the restricted area.

SUMMARY OF THE INVENTION

An object of the present invention is to provide a hybrid car which can reach a destination via a restricted area forbidden for automobiles that emit exhaust gases even in the case where the restricted area is between the current position of the hybrid car and the destination.

According to a first aspect of the invention, there is provided a hybrid car using both an electric motor driven by electric power stored in a battery and an internal combustion engine driven by combustion energy of internally burned fuel as sources for driving travel wheels, the hybrid car including: a restricted area detecting unit for detecting whether a restricted area forbidden for automobiles driven by internal combustion engines is forward in a direction of movement of the hybrid car or not, and detecting arrival of the hybrid car at the restricted area; and a travel mode switching unit for selecting one mode from a motor travel mode using only the electric motor to run the hybrid car and an ordinary travel mode using the electric motor and/or the internal combustion engine suitably to run the hybrid car, on the basis of a detection result detected by the restricted area detecting unit.

There is the case where an ETC (Electronic Toll Charge system) is provided in a toll road so that entrance into the toll road is detected by a receiver which receives electric wave from a transmission antenna provided in front of an entrance ramp of the toll road.

As the restricted area detecting unit, there can be used a unit which has an ETC type receiver for receiving electric wave from a transmission antenna provided in each place in front of an entrance of the restricted area in the same manner as in the ETC to thereby detect the presence and distance of the restricted area forward in a direction of movement of the hybrid car and entrance into the retrained zone.

Alternatively, as the restricted area detecting unit, there can be used a unit which has a receiver for receiving information from a VICS (Vehicle Information Communications System) supplying road and traffic information concerning a road (on which automobiles are traveling) and its vicinity as digital information, and a GPS (Global Positioning System) receiver for locating the current position by using an artificial satellite and in which the presence and distance of the restricted area forward in a direction of movement of the hybrid car and entrance into the restricted area can be detected by these receivers. Alternatively, as the restricted area detecting unit, there can be used a unit in which the presence and distance of the restricted area forward in a direction of movement of the hybrid car and entrance into the restricted area can be detected by a navigation system having map information stored therein and having a GPS receiver.

In the first aspect of the invention, when the hybrid car is traveling in the ordinary travel mode, electric power can be accumulated as follows. That is, the battery is controlled so that charging electric energy is higher than discharging electric energy, or an exclusive battery for supplying electric power to the electric motor in the motor travel mode is provided separately so that the exclusive battery can be charged in the ordinary travel mode. In this configuration, when the restricted area detecting unit detects a restricted area forward in the direction of movement of the hybrid car, electric power is accumulated before the hybrid car arrives at the restricted area. Therefore, when the hybrid car arrives at the restricted area, the travel mode switching unit switches the travel mode from the ordinary travel mode to the motor travel mode, and, at the same time, the electric motor can be driven by the accumulated electric power. Hence, only the electric motor can be used for traveling the hybrid car to make the hybrid car pass through the restricted area.

Moreover, arrival of the hybrid car at the restricted area can be automatically detected by the restricted area detecting unit. Hence, when the hybrid car arrives at the restricted area, the travel mode can be automatically switched from the ordinary travel mode using both the electric motor and the internal combustion engine as drive sources to the motor travel mode using only the electric motor as a drive source. As a result, the internal combustion engine is prevented from being operated in the restricted area, so that environmental protection in the restricted area can be achieved.

According to a second aspect of the invention, there is provided a hybrid car using both an electric motor driven by electric power stored in a battery and an internal combustion engine driven by combustion energy of internally burned fuel as sources for driving travel wheels, the battery being rechargeable when the internal combustion engine is driven, the hybrid car including: a restricted area detecting unit for detecting whether a restricted area forbidden for automobiles driven by internal combustion engines is forward in a direction of movement of the hybrid car or not, and detecting arrival of the hybrid car at the restricted area; a required electric energy calculating unit for calculating electric energy required for making the hybrid car pass through the restricted area so that only the electric motor can be operated to make the hybrid car pass through the restricted area; a battery-charge operating time calculating unit for calculating battery-charge operating time required for storing the required electric energy in the battery; a start point calculating unit for calculating a start point for starting a battery-charge operation on the basis of the battery-charge operating time calculated by the battery-charge operating time calculating unit; and a travel mode switching unit for selecting one mode from a battery-charge travel mode for charging the battery during traveling of the hybrid car, a motor travel mode using only the electric motor to run the hybrid car and an ordinary travel mode using the electric motor and the internal combustion engine suitably to run the hybrid car, on the basis of a detection result detected by the restricted area detecting unit and the start point calculated by the start point calculating unit.

In the second aspect of the invention, the restricted area detecting unit is formed in the same manner as in the first aspect of the invention. That is, as the restricted area detecting unit, there can be used as a unit which has an ETC type receiver for receiving electric wave from a transmission antenna provided in each place in front of an entrance of the restricted area to thereby detect the presence and distance of the restricted area forward in the direction of movement of the hybrid car and entrance into the restricted area. Alternatively, as the restricted area detecting unit, there can be used a unit which has a receiver for receiving information from a VICS supplying road and traffic information concerning a road (on which automobiles are traveling) and its vicinity as digital information, and a GPS receiver for locating the current position by using an artificial satellite and in which the presence and distance of the restricted area forward in a direction of movement of the hybrid car and entrance into the restricted area can be detected by these receivers. Alternatively, as the restricted area detecting unit, there can be used a unit in which the presence and distance of the restricted area forward in a direction of movement of the hybrid car and entrance into the restricted area can be detected by a navigation system having map information stored therein and having a GPS receiver.

As in the second aspect of the invention, when the restricted area detecting unit automatically detects a restricted area forward in the direction of movement of the hybrid car, the required electric energy calculating unit calculates electric energy required for operating only the electric motor to make the hybrid car pass through the restricted area, and the battery-charge operating time calculating unit calculates battery-charge operating time to be secured. Then, the start point calculating unit calculates a start point on the basis of the battery-charge operating time so that a battery-charge operation can be started at the start point. When the hybrid car reaches the start point, the travel mode switching unit automatically selects the batter-charge travel mode. Hence, when the hybrid car arrives at the restricted area, electric power sufficient to make the hybrid car pass through the restricted area is stored in the battery so that the hybrid car can pass through the restricted area.

Moreover, arrival of the hybrid car at the restricted area can be automatically detected by the restricted area detecting unit in the same manner as in the first aspect of the invention. Hence, when the hybrid car arrives at the restricted area, the travel mode is automatically switched from the ordinary travel mode using both the electric motor and the internal combustion engine as drive sources to the motor travel mode using only the electric motor as a drive source. As a result, the internal combustion engine is prevented from being operated in the restricted area, so that environmental protection in the restricted area can be achieved.

In the hybrid car, preferably, a navigation system is provided for receiving current position information to measure a current position of a mobile body and indicating the current position on a screen displayed on a display device on the basis of map information stored in the navigation system, and the restricted area detecting unit permits the navigation system to search the map information to thereby detect whether the restricted area is forward in the direction of movement of the hybrid car or not.

In this configuration, detection of the restricted area can be ensured by the navigation system. Moreover, the arrival time required for making the hybrid car arrive at the restricted area and the mileage, height difference and travel time required for making the hybrid car pass through the restricted area can be calculated accurately by the navigation system. Hence, electric energy required for making the hybrid car pass through the restricted area and battery-charge operating time required for charging the battery with the required electric energy can be calculated accurately. When the battery is charged in practice, surplus electric energy generated excessively to ensure the passage of the hybrid car through the restricted area can be reduced. As a result, wasteful energy consumed therefor can be reduced.

Further preferably, in the hybrid car, the navigation system has a route retrieval function for retrieving a route to a destination, and the restricted area detecting unit detects the restricted area on the basis of whether the route retrieved by the navigation system passes through the restricted area or not.

In this configuration, the shortest route to the destination can be found by the navigation system. Moreover, when a restricted area is on the shortest route, the restricted area is detected by the restricted area detecting unit so that a battery-charge operation required for making the hybrid car pass through the restricted area can be carried out securely. As a result, the hybrid car can arrive at the destination while traveling on the shortest route, so that the hybrid car can arrive at the destination in the shortest time.

According to a third aspect of the invention, there is provided a hybrid car using both an electric motor driven by electric power stored in a battery and an internal combustion engine driven by combustion energy of internally burned fuel as sources for driving travel wheels, the battery being rechargeable when the internal combustion engine is driven, the hybrid car including: a restricted area detecting unit for detecting whether a restricted area forbidden for automobiles driven by internal combustion engines is forward in a direction of movement of the hybrid car or not, and detecting arrival of the hybrid car at the restricted area; a required electric energy calculating unit for calculating electric energy required for making the hybrid car pass through the restricted area so that only the electric motor can be operated to make the hybrid car pass through the restricted area; a residual electric energy predicting unit for predicting residual electric energy which will remain in the battery at a point of time when the hybrid arrives at the restricted area; and a bypass instruction unit for comparing the residual electric energy and the required electric energy with each other and outputting a bypass instruction signal when the required electric energy is higher than the residual electric energy.

In the third aspect of the invention, a car having an ETC type receiver as described above, a car having a VICS receiver and a GPS receiver, or a car having a navigation system can be used in the same manner as in the first and second aspects of the invention.

As in the third aspect of the invention, when a restricted area forward in the direction of movement of the hybrid car is automatically detected by the restricted area detecting unit, electric energy required for operating only the electric motor to make the hybrid car pass through the restricted area is calculated by the required electric energy calculating unit and residual electric energy which will remain in the battery at a point of time when the hybrid car arrives at the restricted area is predicted by the residual electric energy predicting unit so that the required electric energy and the residual electric energy are compared with each other by the bypass instruction unit.

When the residual electric energy is higher than the required electric energy, only the electric motor can be driven to make the hybrid car pass through the restricted area.

When the residual electric energy is lower than the required electric energy, shortage of the residual electric, energy is reported by the bypass instruction unit. Hence, a bypass can be found from a map or the like so that the residual electric energy covers the whole distance of the bypass. As a result, the hybrid car can pass through the restricted area.

In the hybrid car, preferably, a navigation system is provided for receiving current position information to measure a current position of a mobile body and indicating the current position on a screen displayed on a display device on the basis of map information stored in the navigation system, and the restricted area detecting unit permits the navigation system to search the map information to thereby detect whether the restricted area is forward in the direction of movement of the hybrid car or not.

In this configuration, detection of the restricted area can be ensured by the navigation system. Moreover, the arrival time required for making the hybrid car arrive at the restricted area and the mileage, height difference and travel time required for making the hybrid car pass through the restricted area can be calculated accurately by the navigation system. Hence, electric energy required for making the hybrid car pass through the restricted area can be calculated accurately, and residual electric energy which will remain in the battery at a point of time when the hybrid car arrives at the restricted area can be predicted accurately, so that judgment for bypassing the restricted area can be made accurately. Moreover, when a by pass is retrieved by the navigation system so that the residual electric energy can cover the whole distance of the bypass, the hybrid car can pass through the restricted area securely.

In the hybrid car, further preferably, the navigation system has a route retrieval function for retrieving a route to a destination, and the restricted area detecting unit detects the restricted area on the basis of whether the route retrieved by the navigation system passes through the restricted area or not.

In this configuration, the shortest route to the destination can be found by the navigation system. Moreover, when the bypass instruction unit issues a bypass instruction signal, a route to the destination is retrieved again by the navigation system on the basis of the residual electric energy so that the shortest bypass can be found. Thus, the hybrid car is made to run on the shortest bypass. As a result, the hybrid car can reach the destination by traveling on the selectable shortest route, so that the hybrid car can reach the destination in the shortest time.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Embodiments of the invention will be described below with reference to the drawings.

Figure 1:
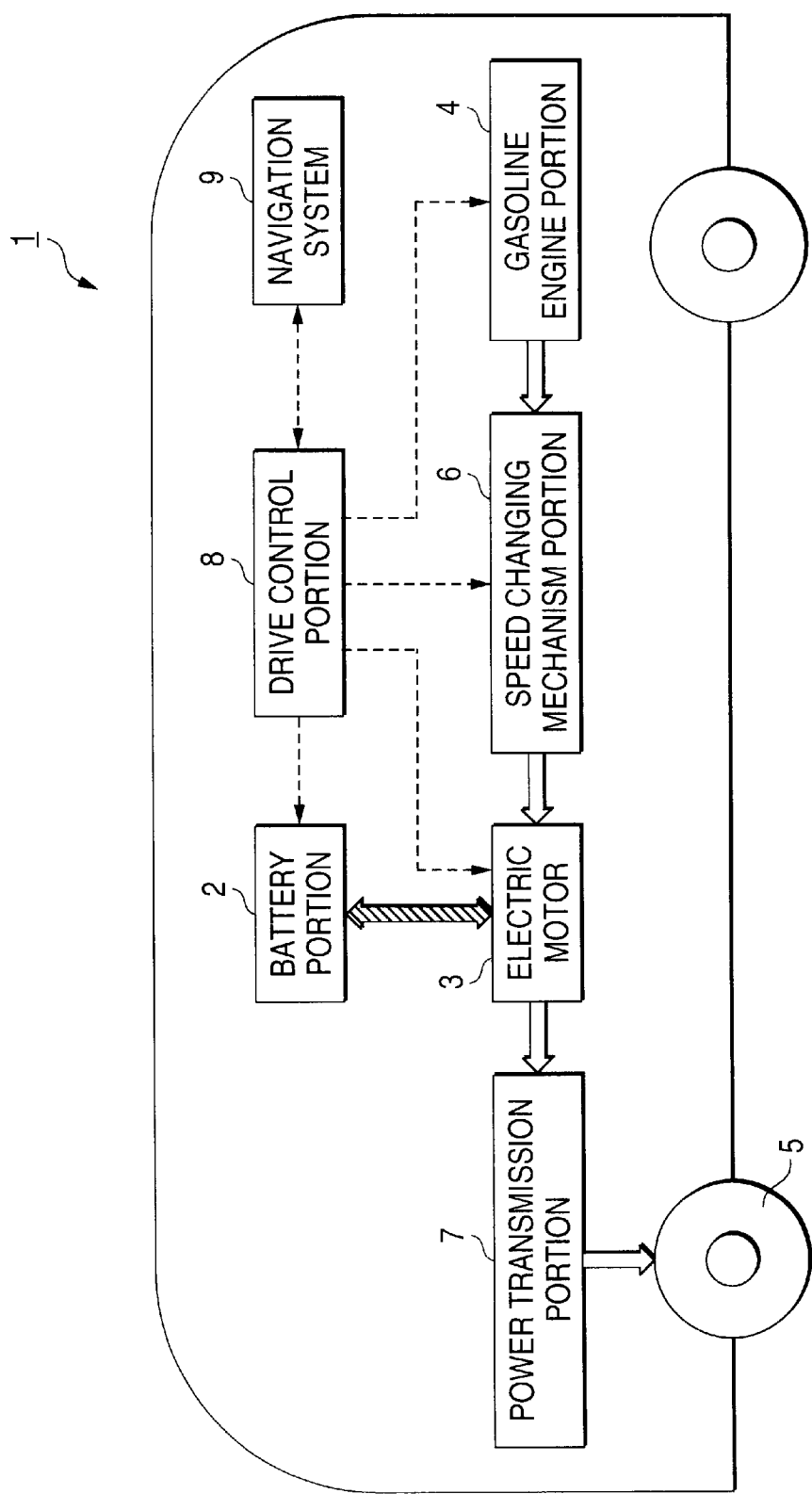
FIG. 1 is a block diagram showing the schematic configuration of a first embodiment of the invention as a whole.

FIG. 1 shows a hybrid car 1 according to a first embodiment of the invention. The hybrid car 1 is a car having a battery portion 2, an electric motor 3, and a gasoline engine portion 4. The battery portion 2 includes a secondary battery. The electric motor 3 is driven by electric power stored in the battery portion 2. The gasoline engine portion 4 is an internal combustion engine driven by combustion energy of internally burned fuel. Both the electric motor 3 and the gasoline engine portion 4 can be used as sources for driving travel wheels 5. The battery portion 2 can be charged through the electric motor 3 driven by the gasoline engine portion 4.

In addition to the battery portion 2, the electric motor 3 and the gasoline engine portion 4, the hybrid car 1 has a speed changing mechanism portion 6, a power transmission portion 7, a drive control portion 8, and a navigation system 9. The speed changing mechanism portion 6 is provided for adjusting the rotational speed of the electric motor 3 while transmitting to the electric motor 3 motive power for driving the gasoline engine portion 4 to rotate. The power transmission portion 7 is provided so that the motive power for driving the electric motor 3 to rotate is transmitted to the travel wheels 5. The drive control portion 8 is provided for controlling the operations of the battery portion 2, the electric motor 3, the gasoline engine portion 4 and the speed changing mechanism portion 6. The navigation system 9 is provided for indicating the current position of the hybrid car 1 through a screen displayed on a display device on the basis of map information stored in the navigation system 9.

Of these portions, the drive control portion 8 performs controlling in accordance with a travel mode set in the hybrid car 1.

That is, three modes, namely, battery-charge travel mode, motor travel mode and ordinary travel mode are provided in the hybrid car 1. The battery-charge travel mode is provided so that the battery portion 2 is charged while the hybrid car 1 is traveling by use of the drive power generated by the gasoline engine portion 4. The motor travel mode is provided so that only the hybrid car 1 is traveling by use of drive power generated by the electric motor 3. The ordinary travel mode is provided so that the hybrid car 1 is traveling by driving both the electric motor 3 and the gasoline engine portion 4 suitably.

When the hybrid car 1 is traveling in the ordinary travel mode, the drive control portion 8 sends control signals to the electric motor 3 and the gasoline engine portion 4 to drive the electric motor 3 and the gasoline engine portion 4 so that the fuel required for traveling is reduced as much as possible in accordance with the travel state such as speed and the operating characteristic of the electric motor 3 and the gasoline engine portion 4.

When, for example, the hybrid car 1 is started to run at a low speed, the drive control portion 8 performs controlling so that only the electric motor 3 excellent in efficiency at a low speed is driven. When the hybrid car 1 is made to run at a constant speed, the drive control portion 8 performs controlling so that the gasoline engine portion 4 is mainly driven while the battery portion 2 is charged with electricity generated by the electric motor 3 as occasion demands. When the hybrid car 1 is to be accelerated, the drive control portion 8 performs controlling so that not only is the gasoline engine portion 4 driven but also the electric motor 3 is driven by electric power stored in the battery portion 2.

On the basis of the control signal given from the drive control portion 8, the battery portion 2 can be charged with electric power generated by the electric motor 3 driven by the gasoline engine portion 4. At the starting time, at the low-speed travel time and at the accelerating time, the battery portion 2 supplies electric power to the electric motor 3 to thereby drive the electric motor 3.

Design is made so that an accumulative electric energy signal corresponding to accumulative electric energy stored in the battery portion 2 is sent from the battery portion 2 to the drive control portion 8. The accumulative electric energy signal is supplied to the navigation system 9 (which will be described later) via the drive control portion 8.

The electric motor 3 serves as a prime mover for driving the travel wheels 5 to rotate and serves also as an electric generator which generates electric power when driven by the gasoline engine portion 4. Hence, either rotation drive power or electric power is output from the electric motor 3 on the basis of the control signal given from the drive control portion 8.

The gasoline engine portion 4 operates in accordance with the travel mode and the travel state to drive the travel wheels 5 to rotate or drive the travel wheels 5 and the electric motor 3 to rotate. The gasoline engine portion 4 is controlled by the drive control portion 8 to operate at an operating point as efficient as possible.

The speed changing mechanism portion 6 is provided so that rotation drive power of the gasoline engine portion 4 operating at the efficient operating point is stepwise or continuously changed to a rotational speed suitable to traveling. For example, an automatic speed changer provided with a torque converter or a CVT (Continuously Variable Transmission) type stepless speed changer may be used as the speed changing mechanism portion 6.

The power transmission portion 7 is provided for finally reducing the rotation drive power driving the travel wheels 5. The power transmission portion 7 includes differential gears for dissolving the difference between inner and outer wheels.

The navigation system 9 receives current position information for measuring the current position of the hybrid car 1 which is a mobile body. The navigation system 9 shows the hybrid car 1 driver the current position on a screen displayed on a display device on the basis of map information stored in the navigation system 9.

Further, the navigation system 9 has a function of automatically switching the travel mode. When a restricted area forbidden for automobiles driven by internal combustion engines is forward in the direction of movement of the hybrid car, the navigation system 9 automatically switches the travel mode from the ordinary travel mode to the battery-charge travel mode to charge the battery portion 2 with sufficient electric power so that the hybrid car 1 can pass through the restricted area in the motor travel mode. When the hybrid car 1 arrives at the restricted area, the navigation system 9 automatically switches the travel mode from the battery-charge travel mode to the motor travel mode.

Incidentally, in practice, the travel mode switching operation is carried out by the drive control portion 8. That is, the navigation system 9 sends data such as a mode switching signal indicating switching timing of the travel mode to the drive control portion 8 but does not carry out the operation of switching the drive mechanism including the electric motor 3 and the gasoline engine portion 4 when the travel mode is switched. On the other hand, the drive control portion 8 actually carries out the operation of switching the drive mechanism including the electric motor 3 and the gasoline engine portion 4 on the basis of various pieces of data such as a mode switching signal sent from the navigation system 9 to the drive control portion 8.

Figure 2:
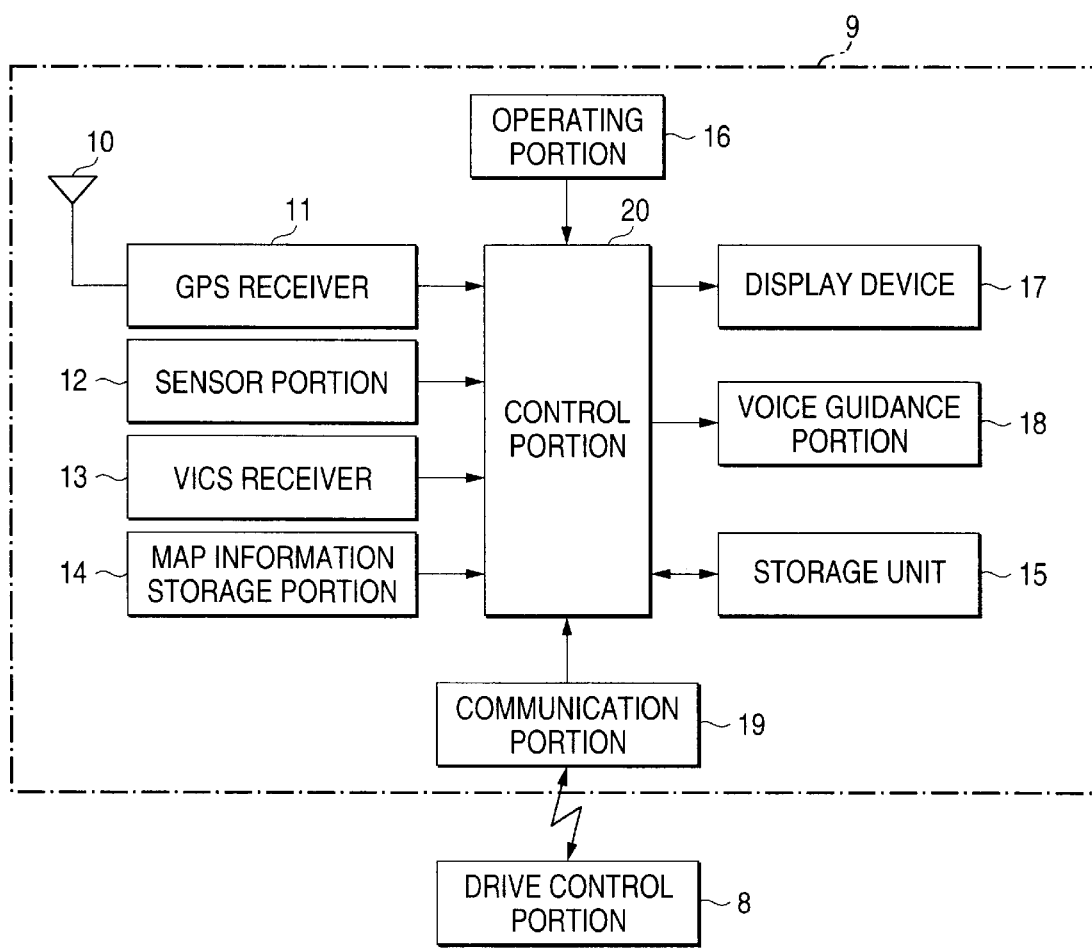
FIG. 2 is a block diagram showing a navigation system in the first embodiment.

As shown in FIG. 2, the navigation system 9 includes: an antenna 10 for receiving electric wave signals transmitted from artificial satellites of GPS and including data concerning three-dimensional position, velocity and time; a GPS receiver 11 for extracting data concerning three-dimensional position of the hybrid car 1 from the electric wave signal received in the antenna 10; a sensor portion 12 in which various kinds of sensors such as a sensor for detecting travel velocity of the hybrid car 1 are provided; a VICS receiver 13 for receiving VICS information; a map information storage portion 14 for storing map information; a storage unit 15 for storing information concerning vehicle travel; an operating portion 16 for performing a manual operation; a display device 17 for displaying map information and vehicle position; and a voice guidance portion 18 for showing the route to the driver by voice; a communication portion 19 for transmitting/receiving data to/from the drive control portion 8; and a control portion 20 for controlling the whole of the navigation system 9.

Of these, the GPS receiver 11 receives electric wave signals from a plurality of artificial satellites possessed by a GPS and extracts position data indicating the three-dimensional current position of the hybrid car 1 and time data indicating an accurate time from these electric wave signals so that the GPS receiver 11 supplies the extracted data to the control portion 20.

The sensor portion 12 has a velocity sensor for detecting the travel velocity of the hybrid car 1, a gravitational acceleration sensor for detecting gravitational acceleration, an acceleration sensor for detecting acceleration generated due to the travel of the hybrid car 1, and an azimuth sensor for detecting the azimuth in the direction of movement of the hybrid car 1. The azimuth sensor contains a so-called gyro sensor.

When the velocity sensor detects the travel velocity of the hybrid car 1, the sensor portion 12 generates velocity data in accordance with the detected travel velocity and supplies the velocity data to the control portion 20.

Further, when the gravitational acceleration sensor detects gravitational acceleration and the acceleration sensor detects acceleration generated due to the travel of the hybrid car 1, the sensor portion 12 compares the detected gravitational acceleration and the detected acceleration with each other, calculates gravitational-direction velocity of the hybrid car 1, generates gravitational-direction velocity data in accordance with the calculated gravitational-direction velocity, and supplies the gravitational-direction velocity data to the control portion 20.

When the azimuth sensor detects the azimuth of the hybrid car 1, the sensor portion 12 generates azimuth data in accordance with the detected azimuth and supplies the azimuth data to the control portion 20.

The VICS receiver 13 extracts road and traffic data concerning traffic jams, restrictions due to road construction, etc. in a wide area from electric wave signals of FM multiplex broadcasting performed by a VICS center, and supplies the road and traffic data to the control portion 20.

The map information storage portion 14 contains a disk drive device from which map information stored in a recording medium such as DVD-ROM (Digital Versatile Disc Read Only Memory) or CD-ROM (Compact Disc Read Only Memory) is read.

Information stored in the map information storage portion 14 is three-dimensionally structured map information, that is, map information including heights of respective points on a map and information necessary for movement of automobiles, for example, information such as zone information indicating that a predetermined zone on a map is a restricted area forbidden for automobiles driven by internal combustion engines such as gasoline engines or diesel engines.

The storage unit 15 stores route information concerning settings registered in the navigation system 9 by the user such as a driver, a destination, a start point, a route and road data on the route, and time information concerning date and time of the route information. A navigation history database generated by accumulation of the route information and the time information is formed in the storage unit 15.

The operating portion 16 contains a remote control device having several kinds of keys such as function keys for various kinds of operations, and ten keys indicated by numerals 0 to 9.

The display device 17 displays a guidance scene based on the map information output from the map information storage portion 14. Besides a pointer indicating the direction of movement, information concerning the state of a road forward in the direction of movement, the destination, etc. is indicated in the guidance scene of the display device 17.

The voice guidance portion 18 shows the direction of movement at a course alteration point by voice before the hybrid car 1 arrives at the course alteration point such as an interchange or junction on a highway or a toll road or an intersection on an ordinary road.

The communication portion 19 performs two-way communication for transmission of data and instructions such as a travel mode switching signal transmitted from the navigation system 9 to the drive control portion 8, and an accumulative electric energy signal detected in the battery portion 2 and transmitted from the drive control portion 8 to the navigation system 9.

The control portion 20 performs a navigation process for guiding the driver of the hybrid car 1 and a restricted area passing process for automatically switching the travel mode to make the hybrid car 1 pass through the restricted area.

Figure 3:
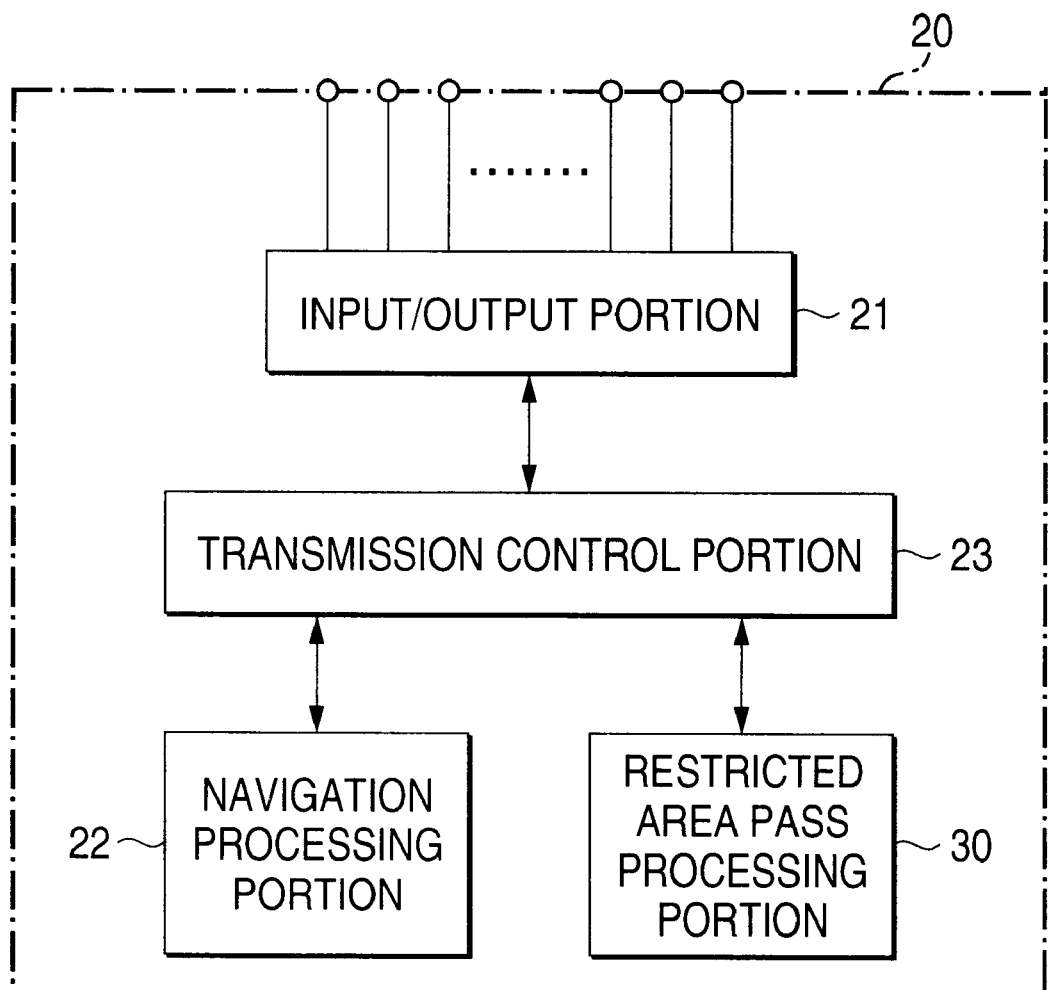
FIG. 3 is a block diagram showing important part of the navigation system in the first embodiment.
Figure 4:
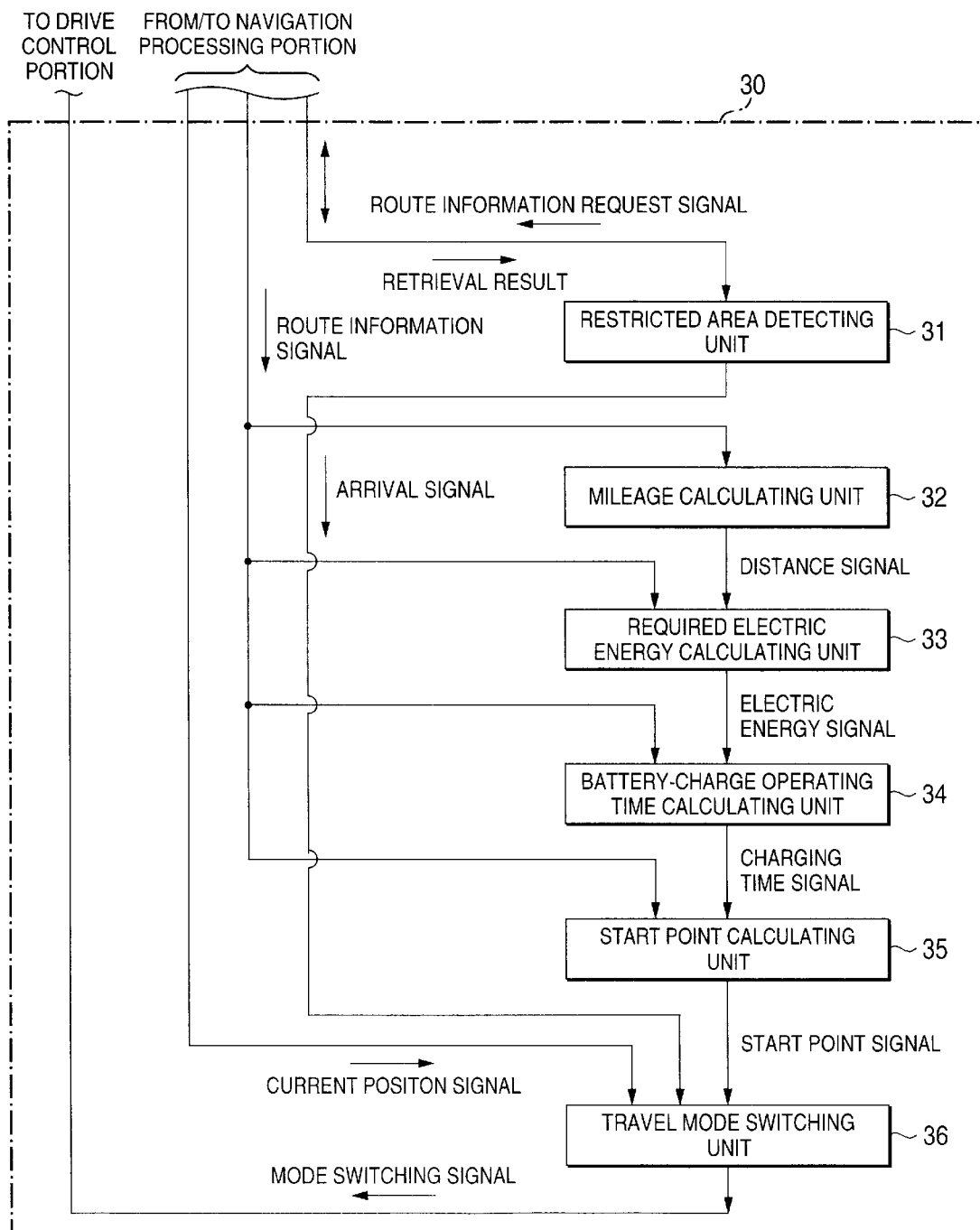
FIG. 4 is a block diagram showing a restricted area pass processing portion in the first embodiment.

As shown in FIG. 3, the control portion 20 has: an input/output portion 21 for inputting/outputting signals as data and instructions from/to a series of portions in a range of from the GPS receiver 11 to the communication portion 19; a navigation processing portion 22 for performing the navigation process; a restricted area pass processing portion 30 for performing the restricted area passing process; and a transmission control portion 23 for controlling transmission of data among the three of the input/output portion 21, the navigation processing portion 22 and the restricted area pass processing portion 30.

Of these, the restricted area pass processing portion 30 detects whether a restricted area forbidden for automobiles that emit exhaust gases is forward in the direction of movement of the hybrid car 1 or not, and performs the restricted area passing process when the restricted area is detected.

That is, the restricted area pass processing portion 30 has a restricted area detecting unit 31, a mileage calculating unit 32, a required electric energy calculating unit 33, a battery-charge operating time calculating unit 34, a start point calculating unit 35, and a travel mode switching unit 36. The restricted area detecting unit 31 detects the arrival of the hybrid car 1 at the restricted area while detecting whether there is a restricted area forward in a direction of movement of the hybrid car 1 or not. The mileage calculating unit 32 calculates mileage in the restricted area. The required electric energy calculating unit 33 calculates electric energy required for operating only the electric motor 3 to make the hybrid car 1 pass through the restricted area. The battery-charge operating time calculating unit 34 calculates battery-charge operating time of the gasoline engine portion 4 required for generating the required electric energy calculated by the required electric energy calculating unit 33. The start point calculating unit 35 calculates a start point for starting the battery-charge operation on the basis of the battery-charge operating time calculated by the battery-charge operating time calculating unit 34. The travel mode switching unit 36 selects one travel mode from a battery-charge travel mode for charging the battery portion 2 during the travel of the hybrid car 1, a motor travel mode for operating only the electric motor 3 to run the hybrid car 1 and an ordinary travel mode for operating both the electric motor 3 and the gasoline engine portion 4 suitably to run the hybrid car 1, on the basis of the detection result detected by the restricted area detecting unit 31 and the start point calculated by the start point calculating unit 35.

The navigation processing portion 22 of the navigation system 9 has a route retrieval function for retrieving a route to the destination.

On the other hand, the restricted area detecting unit 31 makes the navigation processing portion 22 of the navigation system 9 search the map information to thereby detect whether a restricted area is forward in the direction of movement of the hybrid car 1 or not. Thus, the restricted area detecting unit 31 detects the arrival of the hybrid car 1 at the restricted area on the basis of the position measuring function of the navigation processing portion 22.

When a restricted area forward in the direction of movement of the hybrid car 1 is detected, the restricted area detecting unit 31 sends a route information request signal to the navigation processing portion 22.

Upon reception of the route information request signal, the navigation processing portion 22 sends a route information signal concerning the route to the destination to the mileage calculating unit 32, the required electric energy calculating unit 33, the battery-charge operating time calculating unit 34 and the start point calculating unit 35, and sends a current position signal indicating the current position of the hybrid car 1 to the travel mode switching unit 36.

When the arrival of the hybrid car 1 at the restricted area is detected, the restricted area detecting unit 31 sends an arrival signal to the travel mode switching unit 36.

The mileage calculating unit 32 calculates mileage in the restricted area on the basis of the route information signal given from the navigation processing portion 22, and sends the calculated mileage as a distance signal to the required electric energy calculating unit 33. Incidentally, the distance signal contains the amount of gravitational-direction movement of the hybrid car 1, that is, the amount of up-movement and the amount of down-movement of the hybrid car 1.

The required electric energy calculating unit 33 calculates electric energy required for making the hybrid car 1 pass through the restricted area on the basis of the route information signal given from the navigation processing portion 22 and the distance signal given from the mileage calculating unit 32 and sends the calculated required electric energy as an electric energy signal to the battery-charge operating time calculating unit 34.

For calculation of the electric energy required for making the hybrid car 1 pass through the restricted area, the required electric energy calculating unit 33 also uses height difference generated in the route as a factor necessary for calculation of the required electric energy.

The battery-charge operating time calculating unit 34 calculates charging time required for charging the battery portion 2 on the basis of the route information signal given from the navigation processing portion 22 and the electric energy signal given from the required electric energy calculating unit 33, and sends the calculated charging time as a charging time signal to the start point calculating unit 35.

The start point calculating unit 35 calculates a start point for starting a battery-charge operation on the basis of the route information signal given from the navigation processing portion 22 and the charging time signal given from the battery-charge operating time calculating unit 34, and sends the calculated start point as a start point signal to the travel mode switching unit 36.

More specifically, the start point calculating unit 35 detects charge-enabled regions, that is, regions except charge-disabled regions such as steep upward slopes, on a travel route of from the current position to the restricted area on the basis of the route information signal given from the navigation processing portion 22, and accumulates the time required for traveling the hybrid car 1 on the charge-enabled regions to thereby calculate the start point.

The travel mode switching unit 36 selects one travel mode from a battery-charge travel mode, a motor travel mode and an ordinary travel mode on the basis of the current position signal given from the navigation processing portion 22, the arrival signal given from the restricted area detecting unit 31 and the start point signal given from the start point calculating unit 35 and sends a mode switching signal for switching the travel mode to the selected travel mode to the drive control portion 8 controlling the electric motor 3, the gasoline engine portion 4, etc.

Figure 5A:
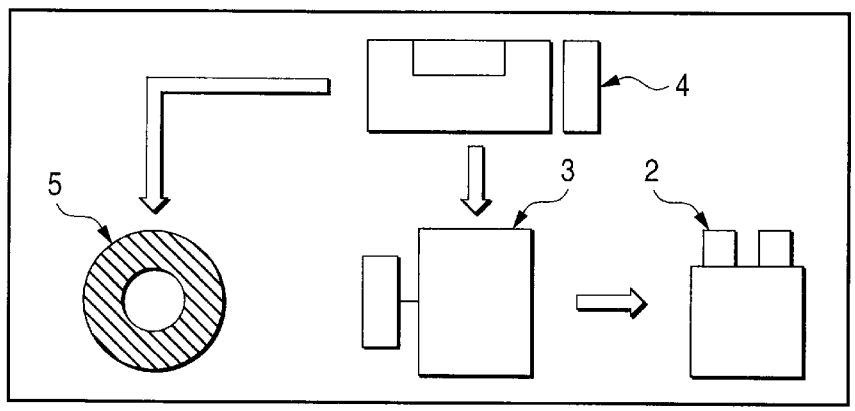
FIGS. 5A to 5C are typical views for explaining travel modes in the first embodiment.

Upon reception of the mode switching signal for selecting the battery-charge travel mode, as shown in FIG. 5A, the drive control portion 8 controls the gasoline engine portion 4 to drive the travel wheels 5 and the electric motor 3. That is, controlling is performed so that the hybrid car 1 can run while the battery portion 2 is charged.

Figure 5B:
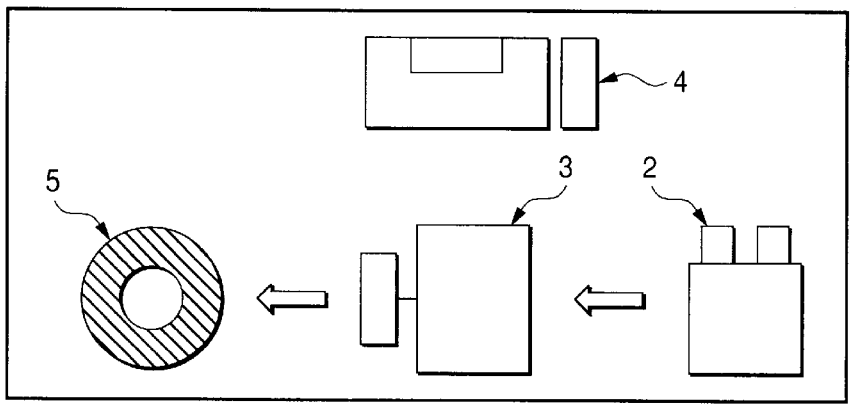

Upon reception of the mode switching signal for selecting the motor travel mode, as shown in FIG. 5B, the drive control portion 8 controls the electric motor 3 to be operated by electric power accumulated in the battery portion 2 and controls the gasoline engine portion 4 to be stopped. That is, controlling is performed so that only the drive force of the electric motor 3 drives the travel wheels 5 to run the hybrid car 1.

Figure 5C:
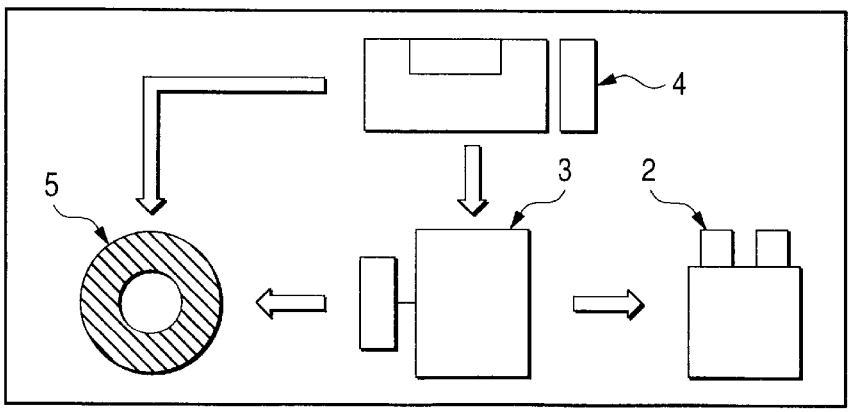

Upon reception of the mode switching signal for selecting the ordinary travel mode, as shown in FIG. 5C, the drive control portion 8 controls the electric motor 3 to be operated by electric power accumulated in the battery portion 2 and controls the electric motor 3 and the gasoline engine portion 4 to be operated suitably. That is, controlling is performed so that the electric motor 3 and the gasoline engine portion 4 drive the travel wheels 5 to run the hybrid car 1 as efficiently as possible.

The operation of the hybrid car 1 according to the first embodiment will be described below.

When the navigation system 9 is activated while the hybrid car 1 according to the first embodiment is traveling in the ordinary travel mode, the navigation processing portion 22 and the restricted area pass processing portion 30 are activated.

Figure 6:
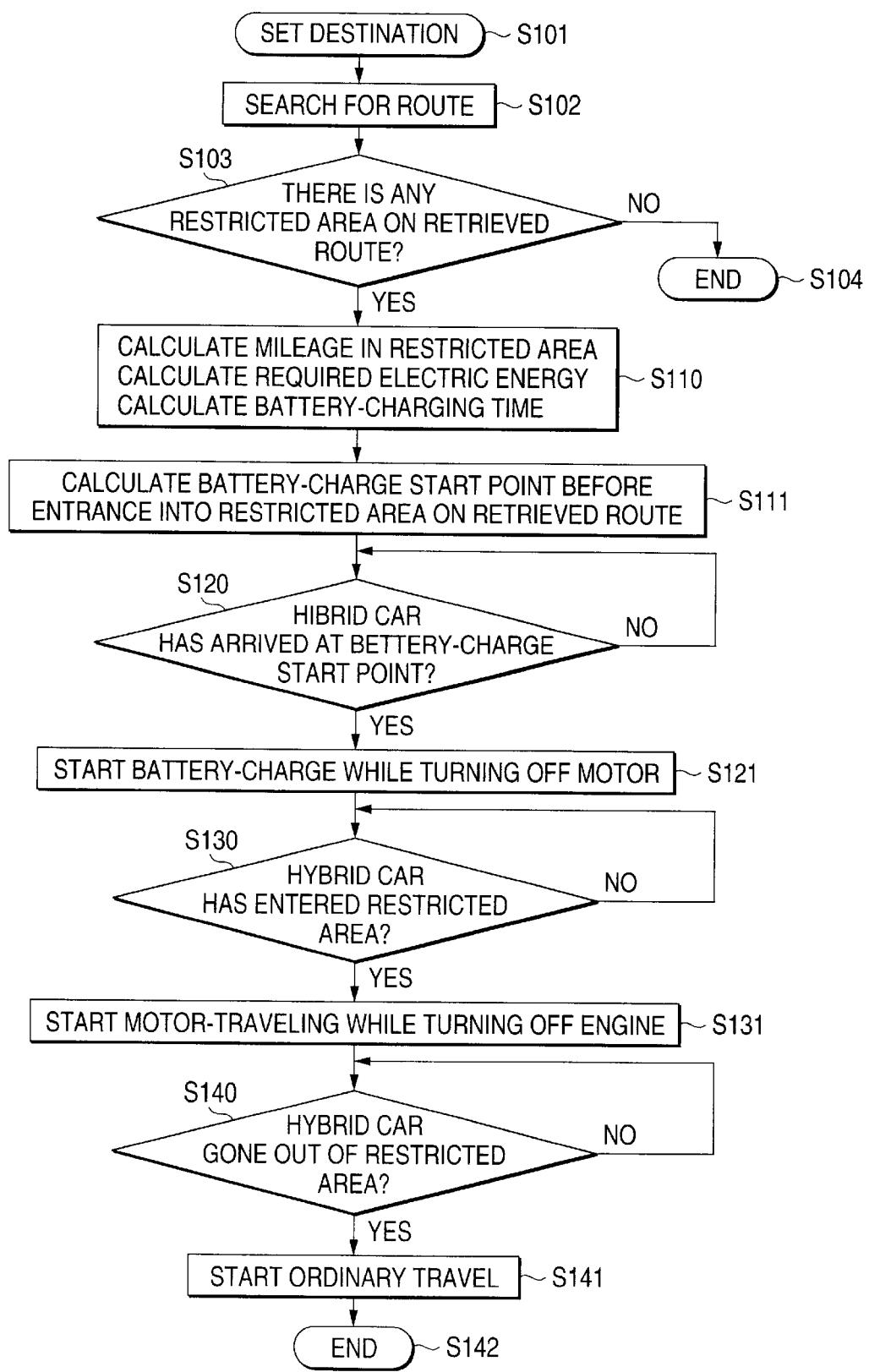
FIG. 6 is a flow chart for explaining an operation in the first embodiment.

Then, as shown in FIG. 6, in step S101, a destination is inputted into the navigation system 9. When the inputting of the destination is completed, the situation of the procedure goes to step S102.

In the step S102, the navigation processing portion 22 of the navigation system 9 retrieves a route from the current position to the destination.

When the optimum route to the destination is selected, in step S103, the restricted area detecting unit 31 detects whether a restricted area forbidden for automobiles driven by internal combustion engines is forward in the direction of movement of the hybrid car 1 on the selected route or not.

When there is no restricted area detected in the step S103, the situation of the procedure goes to step S104. In the step S104, processing in the retrained zone pass processing portion 30 is terminated.

Figure 7:
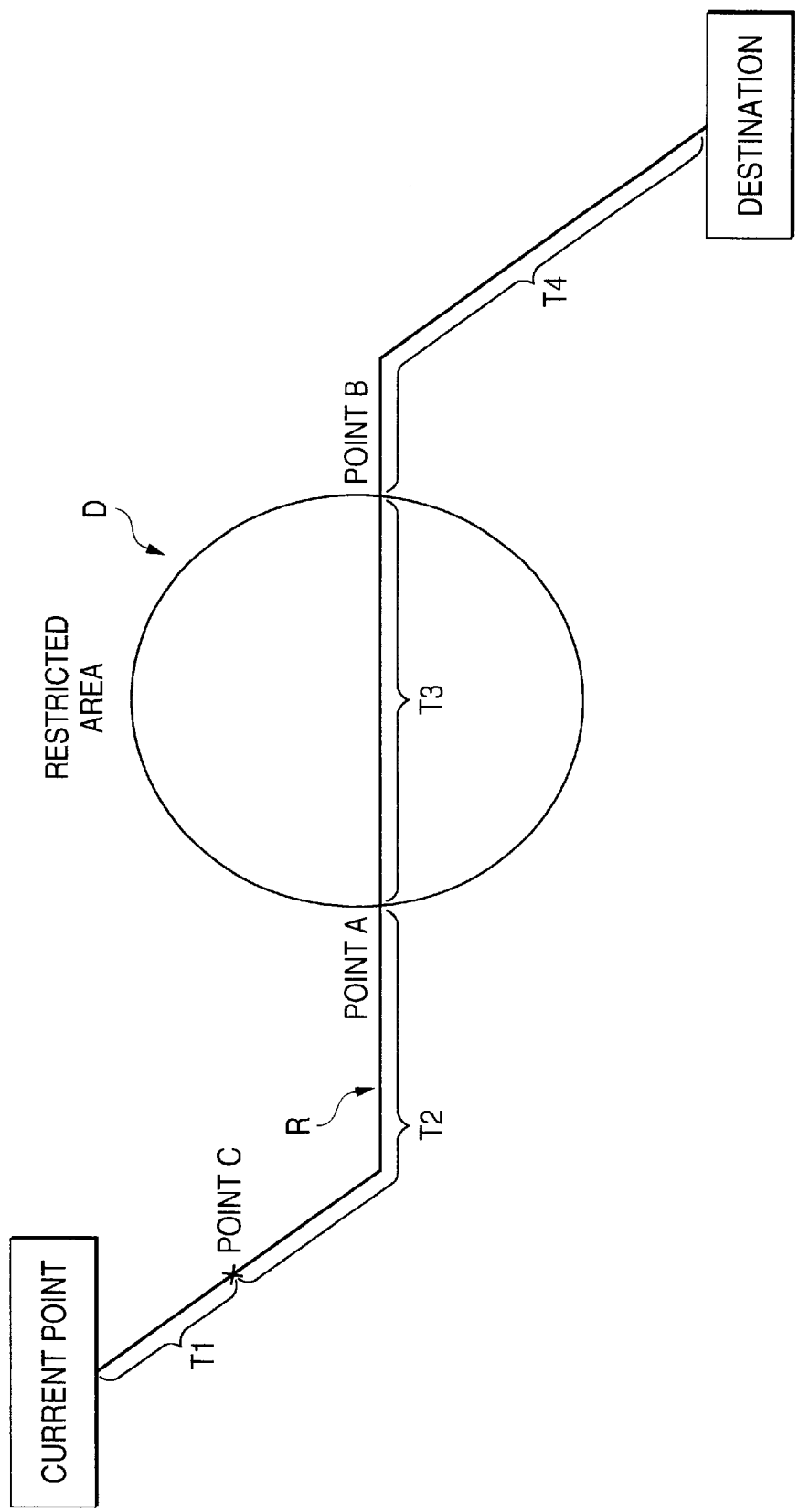
FIG. 7 is a route chart for explaining an operation in the first embodiment.

On the other hand, when a restricted area D starting at point A and ending at point B on the route R as shown in FIG. 7 is detected at a location in front of the restricted area D in the step S103, the situation of the procedure goes to step S110.

Referring back to FIG. 6, in the step 110, mileage in the restricted area is calculated by the mileage calculating unit 32, electric energy required for making the hybrid car 1 pass through the restricted area is calculated by the required electric energy calculating unit 33, and battery-charge operating time required for charging the battery portion 2 is calculated by the battery-charge operating time calculating unit 34. When the calculation process of the battery-charge operating time is completed, the situation of the procedure goes to step S111.

In the step S111, the position of point C (see FIG. 7) which is a start point for starting a battery-charge operation is calculated by the start point calculating unit 35. When the calculation of the point C is completed, the situation of the procedure goes to step S120.

The step S120 is repeated if the hybrid car 1 has not arrived at the point C yet. When the hybrid car 1 arrives at the point C, the situation of the procedure goes to step S121. In the step S121, the travel mode is switched from the ordinary travel mode to the battery-charge travel mode and then the situation of the procedure goes to step S130.

The step S130 is repeated if the hybrid car 1 has not arrived at the point A yet. When the hybrid car 1 arrives at the point A, the situation of the procedure goes to step S131. In the step S131, the travel mode is switched from the battery-charge travel mode to the motor travel mode and then the situation of the procedure goes to step S140.

The step 140 is repeated if the hybrid car 1 has not arrived at the point B yet. When the hybrid car 1 arrives at the point B, the situation of the procedure goes to step S141. In the step S141, the travel mode is switched from the motor travel mode to the ordinary travel mode and then the situation of the procedure goes to step S142. In the step S142, processing in the restricted area pass processing portion 30 is terminated.

In this manner, the hybrid car 1 runs as shown in FIG. 7. That is, in a section T1 from the current position to the point C, the hybrid car 1 runs in the ordinary travel mode. In a section T2 from the point C to the point A, the hybrid car 1 runs in the battery-charge travel mode while electric power sufficient to make the hybrid car 1 pass through the restricted area D is accumulated in the battery portion 2. In a section T3 from the point A to the point B, that is, in the restricted area, the hybrid car 1 runs in the motor travel mode. In a section T4 from the point B to the destination, the hybrid car 1 runs in the ordinary travel mode. In such a manner, the optimum route is selected so that the hybrid car 1 can reach the destination in the shortest time without any bypass from the current position to the destination.

According to the first embodiment, the following effect can be obtained.

That is, the hybrid car 1 has: a restricted area detecting unit 31 for detecting whether a restricted area D forbidden for automobiles driven by internal combustion engines is forward in the direction of movement of the hybrid car 1 or not, and detecting the arrival of the hybrid car 1 at the restricted area D; a required electric energy calculating unit 33 for calculating electric energy required for operating only the electric motor 3 to make the hybrid car 1 pass through the restricted area D; a battery-charge operating time calculating unit 34 for calculating battery-charge operating time required for charging the battery portion 2 with the required electric energy; and a start point calculating unit 35 for calculating a start point for starting a battery-charge operation on the basis of the battery-charge operating time calculated by the battery-charge operating time calculating unit 34. Hence, before the hybrid car 1 arrives at the restricted area D, electric power sufficient to make the hybrid car 1 pass through the restricted area D can be accumulated in the battery portion 2. As a result, the hybrid car 1 can pass through the restricted area D securely.

Moreover, the arrival at the restricted area D can be automatically detected by the restricted area detecting unit 31. The hybrid car 1 further has a travel mode switching unit 36 for switching the travel mode on the basis of the current position signal given from the navigation processing portion 22, the arrival signal given from the restricted area detecting unit 31 and the start point signal given from the start point calculating unit 35. Hence, when the hybrid car 1 arrives at the restricted area D, the travel mode is automatically switched from the ordinary travel mode to the motor travel mode. As a result, the internal combustion engine is prevented from being operated in the restricted area, so that environmental protection in the restricted area can be achieved.

The restricted area detecting unit 31 used makes the navigation system 9 search map information to thereby detect whether a restricted area D is forward in the direction of movement of the hybrid car 1. Hence, the restricted area D can be detected securely. Moreover, the arrival time required for arrival at the restricted area D and the mileage, height difference and travel time required for making the hybrid car 1 pass through the restricted area D can be calculated accurately. Hence, electric energy required for making the hybrid car pass through the restricted area D and battery-charge operating time required for charging the battery with the required electric energy can be calculated accurately. When the battery is to be charged in practice, surplus electric energy excessively generated to make the hybrid car 1 securely pass through the restricted area can be reduced. As a result, wasteful energy consumed therefor can be reduced.

Moreover, the navigation system 9 used has a route retrieval function for retrieving a route to the destination. Moreover, the restricted area detecting unit 31 used detects the restricted area D on the basis of whether the route retrieved by the navigation system 9 passes through the restricted area D or not. Hence, the navigation system 9 can find the shortest route to the destination. Moreover, when the shortest route passes through the restricted area D, the restricted area detecting unit 31 detects the restricted area D so that a battery-charge operation for making the hybrid car 1 pass through the restricted area D can be carried out securely. As a result, the hybrid car can reach the destination in the shortest time by traveling on the shortest route.

Moreover, the required electric energy calculating unit 33 calculates required electric energy on the basis of the route retrieved by the navigation system 9. Hence, as described above, the mileage, height difference and travel time in the actually travel route can be calculated accurately by the navigation system 9. Mileage required for arrival at the restricted area and electric energy required for passage through the restricted area can be calculated more accurately. Also from this point of view, when the battery is to be charged in practice, surplus electric energy excessively generated to make the hybrid car pass through the restricted area securely becomes lower. As a result, wasteful energy consumed therefor can be reduced more.

Figure 8:
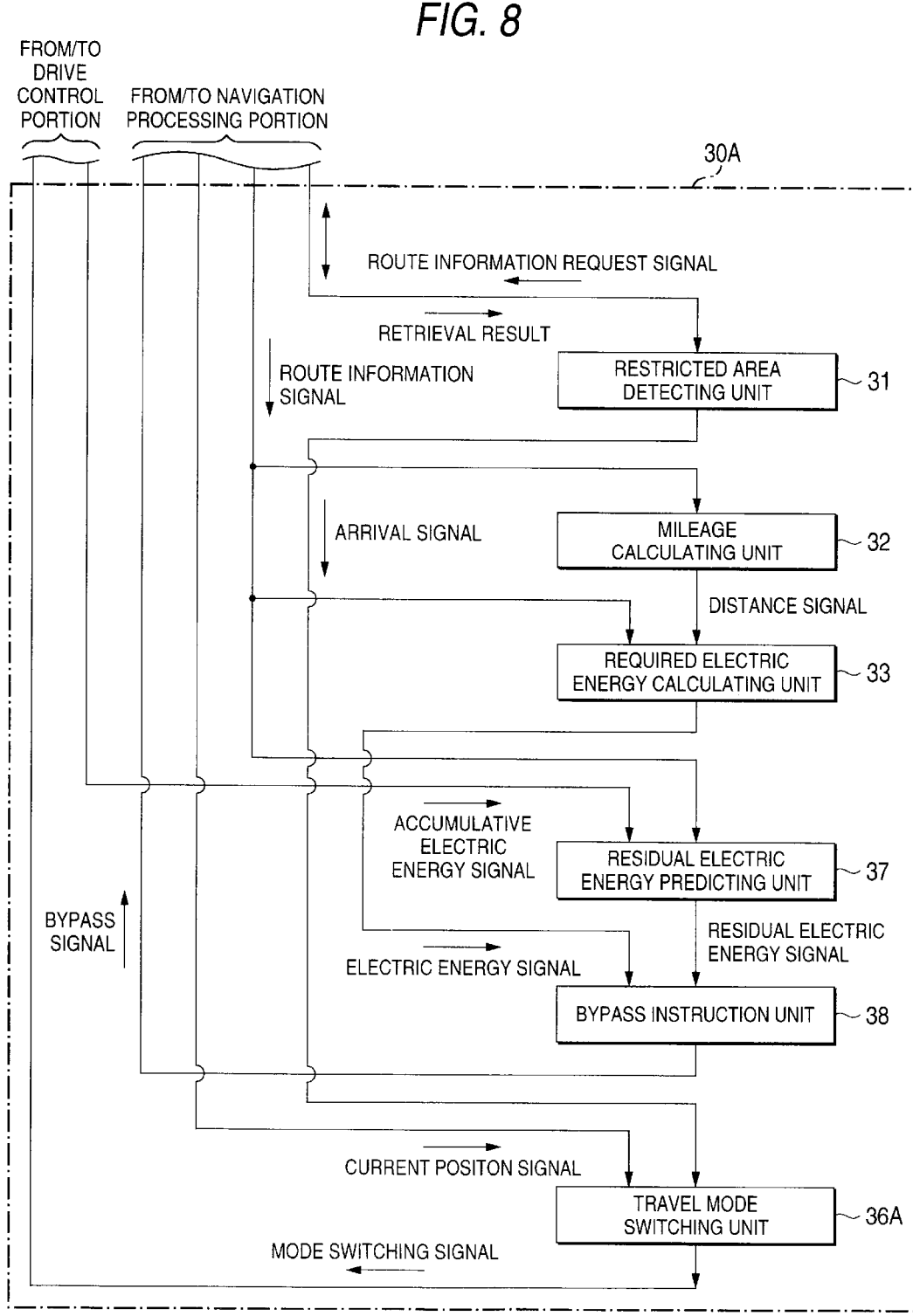
FIG. 8 is a block diagram showing a restricted area pass processing portion in a second embodiment of the invention.

FIG. 8 shows a hybrid car 1 according to a second embodiment of the invention. The second embodiment is configured so that the restricted area pass processing portion 30 in the first embodiment for charging the battery portion 2 with electric energy required for making the hybrid car pass through the restricted area is replaced by a restricted area pass processing portion 30A for shortening mileage in the restricted area in accordance with the residual electric energy remaining in the battery portion 2.

That is, like the restricted area pass processing portion 30, the restricted area pass processing portion 30A has a restricted area detecting unit 31, a mileage calculating unit 32 and a required electric energy calculating unit 33. On the other hand, the battery-charge operating time calculating unit 34 and the start point calculating unit 35 in the restricted area pass processing portion 30 are, however, removed from the restricted area pass processing portion 30A. In place of these units, the restricted area pass processing portion 30A has a residual electric energy predicting unit 37, and a bypass instruction unit 38. The residual electric energy predicting unit 37 predicts residual electric energy which will remain in the battery portion 2 at a point of time when the hybrid car arrives at the restricted area. The bypass instruction unit 38 compares the residual electric energy predicted by the residual electric energy predicting unit 37 and the electric energy required for making the hybrid car pass through the restricted area with each other and outputs a bypass instruction signal when the required electric energy is higher than the residual electric energy.

The restricted area pass processing portion 30A further has a travel mode switching unit 36A which selects one travel mode from the two of a motor travel mode using only the electric motor 3 to run the hybrid car and an ordinary travel mode for driving the electric motor 3 and the gasoline engine portion 4 suitably to run the hybrid car.

The residual electric energy predicting unit 37 predicts residual electric energy at a point of time when the hybrid car arrives at the restricted area, on the basis of the route information signal given from the navigation processing portion 22 and the accumulative electric energy signal given from the drive control portion 8. Then, the residual electric energy predicting unit 37 sends the predicted electric energy as a residual electric energy signal to the bypass instruction unit 38.

For example, the residual electric energy predicting unit 37 predicts residual electric energy as follows. That is, the residual electric energy predicting unit 37 predicts discharge electric energy from the battery portion 2 and charge electric energy into the battery portion 2 before arrival at the restricted area on the basis of the route information signal given from the navigation processing portion 22. Then, the residual electric energy predicting unit 37 calculates an electric energy difference by subtracting the discharge electric energy from the charge electric energy. Then, the residual electric energy predicting unit 37 predicts residual electric energy by adding the difference to the accumulative electric energy currently stored in the battery portion 2.

Upon reception of the bypass signal from the bypass instruction unit 38, the navigation processing portion 22 retrieves another route to the destination again.

When the required electric energy for the route retrieved by the navigation processing portion 22 is higher than the residual electric energy, the bypass instruction unit 38 sends a bypass signal to the navigation processing portion 22 again to make the navigation processing portion 22 retrieve another route. The retrieving operation of the navigation processing portion 22 is repeated again and again unless the required electric energy is lower than the residual electric energy.

The travel mode switching unit 36A selects either motor travel mode or ordinary travel mode on the basis of the current position signal given from the navigation processing portion 22 and the arrival signal given from the restricted area detecting unit 31. Then, the travel mode switching unit 36A sends a mode switching signal for switching the travel mode to the selected travel mode to the drive control portion 8 which controls the electric motor 3 and the gasoline engine portion 4.

The operation of the hybrid car according to the second embodiment will be described below.

When the navigation system 9 is activated while the hybrid car 1 according to the second embodiment is traveling in the ordinary travel mode, the navigation processing portion 22 and the restricted area pass processing portion 30A are activated.

Figure 9:
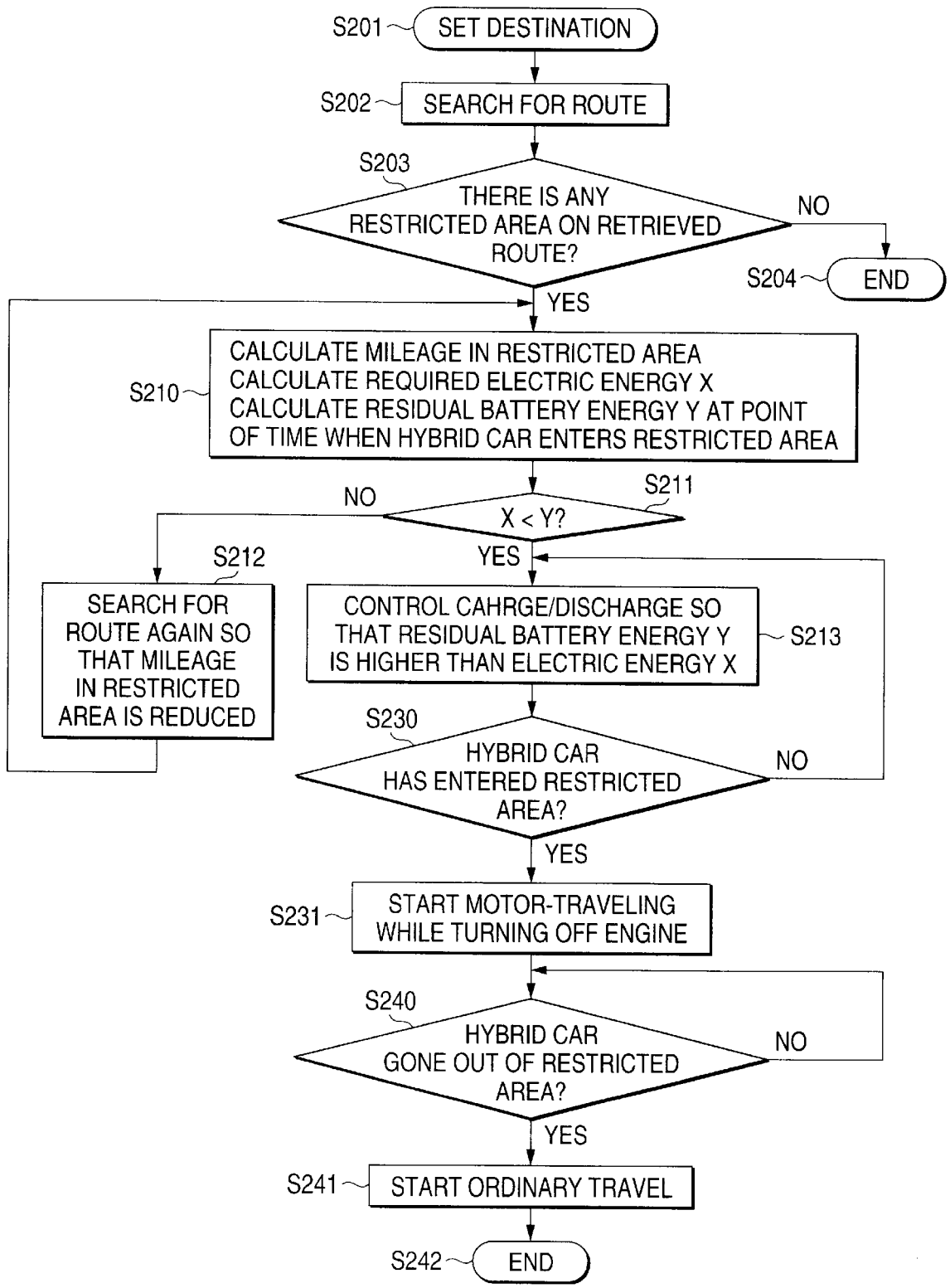
FIG. 9 is a flow chart for explaining an operation in the second embodiment.

Then, as shown in FIG. 9, in step S201, a destination is inputted into the navigation system 9. When the inputting of the destination is completed, the situation of the procedure goes to step S202. Steps S202 to S204 are equivalent to the steps S102 to S104 respectively and the description of the steps S202 to S204 will be omitted.

Figure 10:
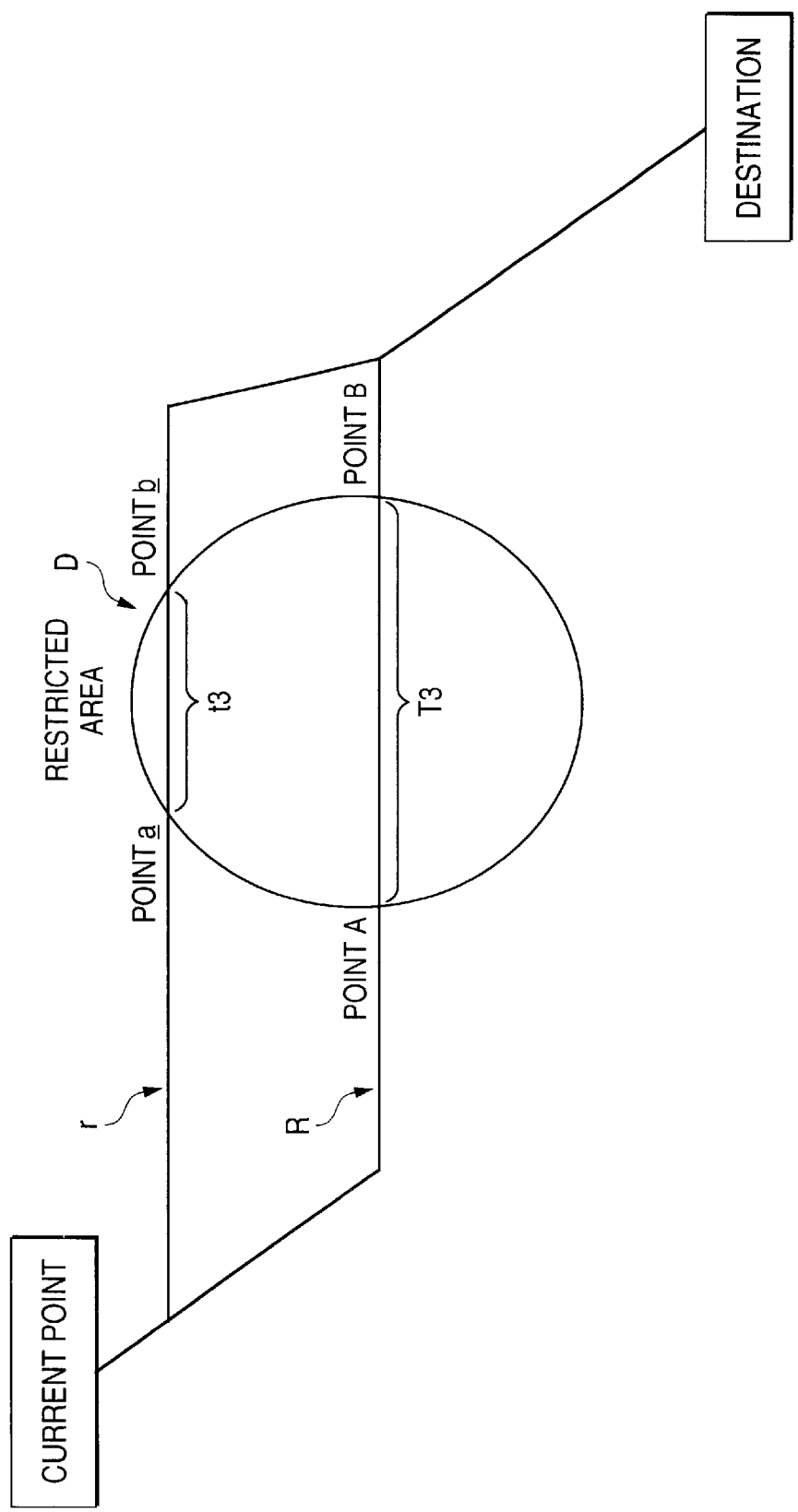
FIG. 10 is a route chart for explaining an operation in the second embodiment.

When a restricted area D starting at point A and ending at point B on the route R as shown in FIG. 10 is detected at a location in front of the route R in step S203, the situation of the procedure goes to step S210.

Referring back to FIG. 9, in the step S210, mileage in the restricted area D is calculated by the mileage calculating unit 32, electric energy X required for making the hybrid car 1 pass through the restricted area D is calculated by the required electric energy calculating unit 33, and residual electric energy Y which will remain in the battery portion 2 at a point of time when the hybrid car 1 arrives at the restricted area D is calculated by the residual electric energy predicting unit 37. When the calculation process of the residual electric energy is completed, the situation of the procedure goes to step S211.

In the step S211, the bypass instruction unit 38 compares the electric energy X and the residual electric energy Y with each other. When the hybrid car 1 cannot pass through the restricted area D because the electric energy X is higher than the residual electric energy Y, the situation of the procedure goes to step S212. On the other hand, when the hybrid car 1 can pass through the restricted area D because the residual electric energy Y is higher than the electric energy X, the situation of the procedure goes to step S213.

In the step S213, when the hybrid car 1 arrives at an entrance of the restricted area, a battery charge/discharge control process is started so that the battery residual electric energy Y will become larger than the electric energy X. Then, the situation of the procedure goes to step S230.

In the step S230, detection is made as to whether the hybrid car 1 has arrived at the point A or not. When the hybrid car 1 has not arrived at the point A yet, the situation of the procedure goes back to the step S213 to continue the battery charge/discharge control process. On the other hand, when the hybrid car 1 has arrived at the point A, the situation of the procedure goes to step S231 to start the motor travel mode. Incidentally, steps S231 to S242 after the step s230 are equivalent to the steps S131 to S142 respectively and the description of the steps S231 to S242 will be omitted.

In the step S212, the bypass instruction unit 38 sends a bypass signal to the navigation processing portion 22 so that the navigation processing portion 22 retrieves another route to the destination. Then, the situation of the procedure goes back to the step S210.

While the required electric energy X for the route retrieved by the navigation processing portion 22 is higher than the residual electric energy Y, the steps S210 to S212 are repeated again and again. When a route to make the required electric energy X lower than the residual electric energy Y is found, the situation of the procedure goes to the step S213.

In this manner, as shown in FIG. 10, even in the case where the mileage of a section T3 in the restricted area D on an initially set route R from the current position to the destination is so large that the hybrid car 1 cannot pass through the section T3 by using the residual electric energy Y, the navigation processing portion 22 can retrieve another route r on the basis of the residual electric energy Y so that the hybrid car 1 can pass through a section t3 which is shorter than the section T3 in the restricted area D, by using the residual electric energy Y. As a result, the hybrid car 1 can reach the destination by traveling the shortest bypass on the selectable shortest route.

The same effect and advantage as those in the first embodiment can be obtained also in the second embodiment. In addition, the following advantage can be further provided by the second embodiment.

That is, the shortest route to the destination can be found by the navigation processing portion 22. Moreover, when the bypass instruction unit 38 issues a bypass instruction signal, the navigation processing portion 22 can be made to retrieve another route to the destination so that the shortest bypass can be found on the basis of the residual electric energy Y. As a result, the hybrid car 1 can reach the destination in the shortest time by traveling the shortest bypass on the selectable shortest route.

Accordingly, it is unnecessary to charge the battery portion 2 before the hybrid car 1 arrives at the restricted area D, and the disadvantage that the hybrid car 1 cannot pass through the restricted area D because the distance to the restricted area is too short to secure sufficient charging time is not generated at all.

Incidentally, the invention is not limited to the embodiments and may contain modifications as follows.

For example, the restricted area detecting unit is not limited to the type using a navigation system. The restricted area detecting unit may have an ETC type receiver so that electric wave from a transmission antenna provided in each place in front of an entrance of the restricted area is received by the receiver to thereby detect the presence and distance of the restricted area forward in the direction of movement of the hybrid car and entrance into the restricted area. Alternatively, the retrained zone detecting unit may has a receiver for receiving information from a VICS supplying road and traffic information concerning a road (on which automobiles are traveling) and its vicinity as digital information, and a GPS receiver for locating the current position by using artificial satellites, so that the presence and distance of the restricted area forward in the direction of movement of the hybrid car and entrance into the restricted area are detected by these receivers. Alternatively, the presence and distance of the restricted area forward in the direction of movement of the hybrid car and entrance into the restricted area may be detected by a navigation system having map information stored therein and having a GPS receiver.

The navigation system may have both the restricted area pass processing portion 30 in the first embodiment and the restricted area pass processing portion 30A in the second embodiment. When both the restricted area pass processing portions 30 and 30A are provided in the navigation system, the restricted area pass processing portions 30 and 30A may be selectively used in accordance with the positional relations among the current position, the restricted area and the destination, the road conditions, etc.

Another type internal combustion engine such as a diesel engine than the gasoline engine may be used as the internal combustion engine.

As described above, in accordance with the invention, even in the case where a restricted area forbidden for automobiles that emit exhaust gases is present between the current position of the hybrid car and the destination, the hybrid car can reach the destination via the restricted area in the shortest time.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A hybrid car using both an electric motor driven by electric power stored in a battery and an internal combustion engine driven by combustion energy of internally burned fuel as sources for driving travel wheels, said battery being rechargeable when said internal combustion engine is driven, said hybrid car comprising:

a restricted area detecting unit for detecting whether a restricted area forbidden for automobiles driven by internal combustion engines is forward in a direction of movement of said hybrid car or not, and detecting arrival of said hybrid car at said restricted area;

a required electric energy calculating unit for calculating electric energy required for making said hybrid car pass through said restricted area so that only said electric motor can be operated to make said hybrid car pass through said restricted area;

a battery-charge operating time calculating unit for calculating battery-charge operating time required for storing said required electric energy in said battery;

a start point calculating unit for calculating a start point for starting a battery-charge operation on the basis of said battery-charge operating time calculated by said battery-charge operating time calculating unit; and a travel mode switching unit for selecting one mode from a battery-charge travel mode for charging said battery during traveling of said hybrid car, a motor travel mode using only said electric motor to run said hybrid car and an ordinary travel mode using said electric motor and said internal combustion engine suitably to run said hybrid car, on the basis of a detection result detected by said restricted area detecting unit and said start point calculated by said start point calculating unit.

2. The hybrid car according to claim 1, further comprising a navigation system for receiving current position information to measure a current position of a mobile body and indicating said current position on a screen displayed on a display device on the basis of map information stored in said navigation system, wherein said restricted area detecting unit permits said navigation system to search said map information to thereby detect whether said restricted area is forward in the direction of movement of said hybrid car or not.

3. The hybrid car according to claim 2, wherein: said navigation system has a route retrieval function for retrieving a route to a destination; and said restricted area detecting unit detects said restricted area on the basis of whether said route retrieved by said navigation system passes through said restricted area or not.

4. A hybrid car using both an electric motor driven by electric power stored in a battery and an internal combustion engine driven by combustion energy of internally burned fuel as sources for driving travel wheels, said battery being rechargeable when said internal combustion engine is driven, said hybrid car comprising:

a restricted area detecting unit for detecting whether a restricted area forbidden for automobiles driven by internal combustion engines is forward in a direction of movement of said hybrid car or not, and detecting arrival of said hybrid car at said restricted area;

a required electric energy calculating unit for calculating electric energy required for making said hybrid car pass through said restricted area so that only said electric motor can be operated to make said hybrid car pass through said restricted area;

a residual electric energy predicting unit for predicting residual electric energy which will remain in said battery at a point of time when said hybrid arrives at said restricted area; and a bypass instruction unit for comparing said residual electric energy and said required electric energy with each other and outputting a bypass instruction signal when said required electric energy is higher than said residual electric energy.

5. The hybrid car according to claim 4, further comprising a navigation system for receiving current position information to measure a current position of a mobile body and indicating said current position on a screen displayed on a display device on the basis of map information stored in said navigation system, wherein said restricted area detecting unit permits said navigation system to search said map information to thereby detect whether said restricted area is forward in the direction of movement of said hybrid car or not.

6. The hybrid car according to claim 5, wherein said navigation system has a route retrieval function for retrieving a route to a destination; and said restricted area detecting unit detects said restricted area on the basis of whether said route retrieved by said navigation system passes through said restricted area or not.

7. The hybrid car according to claim 1, wherein the start point calculating unit calculates the start point by accumulating a time required for traveling the hybrid car except for a charge-disabled region.

* * * * *